United States Patent
Sultan et al.

(10) Patent No.: US 8,017,710 B2
(45) Date of Patent: Sep. 13, 2011

(54) CROSSLINKABLE HIGH PRESSURE POLYETHYLENE COMPOSITION, A PROCESS FOR THE PREPARATION THEREOF, A PIPE AND A CABLE PREPARED THEREOF

(75) Inventors: Bernt-Åke Sultan, Stenungsund (SE); Jeroen Oderkerk, Stenungsund (SE); Kenneth Johansson, Stenungsund (SE); Jonas Jungkvist, Göteborg (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/570,057

(22) PCT Filed: Aug. 28, 2004

(86) PCT No.: PCT/EP2004/009630
§ 371 (c)(1),
(2), (4) Date: Dec. 4, 2006

(87) PCT Pub. No.: WO2005/023908
PCT Pub. Date: Mar. 17, 2005

(65) Prior Publication Data
US 2007/0161758 A1 Jul. 12, 2007

(30) Foreign Application Priority Data
Sep. 5, 2003 (EP) .................................. 03445098

(51) Int. Cl.
*C08F 30/08* (2006.01)
(52) U.S. Cl. .................... 526/279; 524/502; 524/506
(58) Field of Classification Search ................ 526/279; 524/502, 506
See application file for complete search history.

(56) References Cited

U.S. PATENT DOCUMENTS

| | | | |
|---|---|---|---|
| 4,117,195 A * | 9/1978 | Swarbrick et al. | 428/379 |
| 4,707,520 A * | 11/1987 | Keogh | 525/245 |
| 5,430,091 A | 7/1995 | Mahabir | |
| 5,492,760 A | 2/1996 | Sarma et al. | |
| 2005/0049343 A1 * | 3/2005 | Borke et al. | 524/366 |

FOREIGN PATENT DOCUMENTS

| | | |
|---|---|---|
| EP | 0 130 855 | 1/1985 |
| EP | 0 365 289 | 4/1990 |
| EP | 0 365 289 A2 * | 4/1990 |
| EP | 0 501 340 A2 | 9/1992 |

* cited by examiner

*Primary Examiner* — Ling-Siu Choi
(74) *Attorney, Agent, or Firm* — Merchant & Gould P.C.

(57) ABSTRACT

The present invention relates to a crosslinkable high pressure polyethylene composition containing ethylene silane copolymer resin having a content of silane of about 0.1 to 10 weight % and at least one silanol condensation catalyst. The invention further relates to a process for the preparation thereof, to a pipe made of said composition and to the use of the composition as an insulation for a cable.

13 Claims, No Drawings

CROSSLINKABLE HIGH PRESSURE POLYETHYLENE COMPOSITION, A PROCESS FOR THE PREPARATION THEREOF, A PIPE AND A CABLE PREPARED THEREOF

FIELD OF THE INVENTION

The present invention relates to a crosslinkable high pressure polyethylene composition containing ethylene silane copolymer resin having a content of silane of about 0.1 to 10 weight % and at least one silanol condensation catalyst. The invention further relates to a process for the preparation thereof, to a pipe made of said composition and to the use of the composition as an insulation for a cable.

BACKGROUND OF THE INVENTION

Presently commercially available ethylene-vinyltrimethoxysilane copolymer resins having a vinyltrimethoxysilane (VTMS) content in the range of about 1.0-2.0 weight % and a density below 925 kg/m³ are not suitable for pipe applications within the segment of plumbing and heating. Such water crosslinkable polyolefin pipes (PEX-b) do not have the properties required to pass the quality control point of hydrostatic pressure resistance at 95° C. in accordance with i. e. the German medium density norm for PEX pipes, DIN 16894. The lifetime of a pipe according to this norm should be at least 1000 hour at 95° C., the circumferential stress in the pipe wall being 2.8 MPa. At a temperature as high as 95° C. the hydrostatic pressure resistance of the commercially available pipe above is very week and such a pipe has a lifetime of less than 1 hour, i. e. the time to failure is less than 1 hour.

Attempts have been made in order to improve the hydrostatic pressure resistance of pipes made of ethylene-vinyltrimethoxysilane copolymer resins by increasing the density of the copolymer resin by mixing the resin with a high density polyethylene polymer (HDPE, i. e. PE made by low pressure polymerization). However, incorporating about 30 weight % high density polyethylene polymer into the resin and thereby increasing the density thereof to 934 kg/m³ does not result in an increased lifetime. Accordingly such pipes will not pass the quality control of DIN 16894.

Ethylene-vinylsilane copolymers, such as e. g. Visico™, may also be used for moisture crosslinking within the field of cable insulations. However, the prior art silane crosslinked polyethylene insulation materials have exhibited problems with so called "frozen layers", i. e. the molecules of the co-polymer will not have the time to relax when they hit the cold conductor and this will in turn lead to a thin layer of highly oriented molecules being formed close to the conductor. Such orientation of the molecules leads to deterioration of the mechanical properties. Previously, this problem has been solved by preheating the conductor or by decreasing the shear stresses by using a tube on die in stead of a pressure die. However, the investment in a preheater induces higher costs. Furthermore, a reduction of the die pressure by using a tube on die leads to a deterioration of the wetting properties, and this in turn involves reduced adhesion properties between the conductor and the insulation material.

SUMMARY OF THE INVENTION

The object of the present invention is to provide crosslinkable high pressure ethylene silane copolymer resins, wherein the above mentioned problems and drawbacks have been eliminated or at least alleviated.

For this purpose an ethylene silane copolymer resin is provided which has the benefits of being suitable for pipe applications within the segment of gas pipes, plumbing and heating as well as for applications within the segment of cable insulations.

This object has been achieved by a crosslinkable high pressure polyethylene composition containing ethylene silane copolymer resin having a content of silane of about 0.1 to 10 weight % and at least one silanol condensation catalyst, characterised in that the density of the composition is >928 kg/m³.

Preferred embodiments of the polyethylene composition are defined in dependent claims 2-10.

According to a preferred embodiment the density of the composition is >933 kg/m³.

According to another preferred embodiment the ethylene silane copolymer resin is an ethylene-vinyl-triethoxysilane copolymer, an ethylene-gamma-methacryloxy-triethoxysilane copolymer, an ethylene-vinyl-trimethoxysilane copolymer or an ethylene-gamma-trimethoxysilane copolymer resin, preferably an ethylene-vinyltrimethoxysilane copolymer resin.

According to another preferred embodiment the ethylene-vinyltrimethoxysilane copolymer resin further comprises high density polyethylene (HDPE) in an amount of <40 weight %.

According to yet another preferred embodiment the amount of high density polyethylene is 15-35 weight %, preferably 20-30 weight %.

Further, according to a preferred embodiment the MFR$_2$ at 190° C./2.16 kg is 0.1-100 g/10 min, more preferably 0.5-6 g/10 min and most preferably 1-4 g/10 min.

In another preferred embodiment of the invention the elongation at break is >200% as measured according to ISO 527 and the tensile strength at break is >12.5 MPa as measured according to ISO 527.

The gel content is preferably >65 weight % as measured according to ASTM D 2765 and preferably the polyethylene composition further comprises 0.1-2.0 weight % of a drying agent.

Another object of the present invention is to provide a method for the preparation a crosslinkable polymer composition according to any of claims 1-10.

This object has been achieved by a process for the preparation a crosslinkable polymer composition according to any of claims 1-10, characterised in that the process is a high pressure process at a pressure above 1200 bar.

According to a preferred embodiment the polymer composition is crosslinked in the presence of a silanol condensation catalyst comprising a compound of formula (I):

$$ArSO_3H \qquad (I)$$

or a precursor thereof, Ar being a hydrocarbyl substituted aromatic group comprising at least 14 carbon atoms.

In another embodiment of the invention the polymer composition is crosslinked in the presence of a silanol condensation catalyst preferably dibutyl-tin-dilaurate.

Another object of the present invention relates to a pipe made of a crosslinkable polymer composition according to any of claims 1-10.

In a preferred embodiment of the invention the pressure resistance at 95° C. is at least 2.8 MPa, more preferably 3.6 MPa and most preferably 4.4 MPa for a failure time of at least more than 1000 hours.

Finally, the composition of the invention may advantageously also be used as an insulation for a cable.

By the invention a polymer composition is provided which has the properties required to pass the quality control point of hydrostatic pressure resistance at 95° C. in accordance with i. e. the German high density norm for PEX pipes, DIN 16892. The lifetime of a pipe according to this norm should be at least 1000 hours at 95° C., the circumferential stress in the pipe wall being 4.4 MPa.

Accordingly, by the composition of the invention higher pressure resistance is also achieved. Furthermore a high pressure reactor may be used for the production of the composition of the invention.

By the invention a polymer composition is provided which may be used as an insulation for an electrical cable fulfilling the mechanical demands outlined in e. g. VDE 0276-603 ("Verband Deutscher Elektrotechniker") without any requirement of preheating the conductor or any need for protection layers, e. g. polyester tapes, in order to avoid migration of plastisizer from the PVC jacket, commonly used in cables.

Other objects, features, advantages and preferred embodiments of the present invention will become apparent from the following detailed description when taken in conjunction with the appended claims.

DETAILED DESCRIPTION OF PREFERRED EMBODIMENTS

It is well known to use additives to crosslink polymers since this improves most of the properties of the polymer such as heat resistance, chemical resistance and mechanical strength, etc. Crosslinking may be performed by condensation of silanol groups contained in the polymer which can be obtained by hydrolysation of silane groups. For the crosslinking of such polymers, a silanol condensation catalyst must be used. Conventional catalysts are for example tin-organic compounds such as dibutyl tin dilaurate (DBTDL). It is further known that the crosslinking process advantageously may be carried out in the presence of acidic silanol condensation catalysts, such as e. g. Ambicat™ from Borealis AB.

According to one embodiment of the invention the crosslinking process is carried out in the presence of a silanol condensation catalyst comprising a compound of formula (I):

$$ArSO_3H \tag{I}$$

or a precursor thereof, Ar being a hydrocarbyl substituted aromatic group comprising at least 14 carbon atoms. According to another preferred embodiment of the invention the polymer composition is crosslinked in the presence of a silanol condensation catalyst, preferably dibutyl-tin-dilaurate.

By additionally admixing of <40 weight %, more preferably 15-35 weight % and most preferably 20-30 weight % of a high density grafted silane PEX material to the two component blend allow to pass the quality control point at 95° C., the circumferential stress in the pipe wall being 4.4 MPa as stated in the German high density norm for PEX pipes, DIN 16892.

The present invention will now be illustrated by way of non-limiting examples of preferred embodiments in order to further facilitate the understanding of the invention.

EXAMPLES

Example 1

Tests were performed on pipes produced from different polymer compositions and the results are shown below in table 1. The following polymers were used in the examples:

Polymer A: High pressure produced ethylene-vinyl trimethoxysilane copolymer having a density of 930.5 kg/m³, $MFR_{2.16}$=1.9 g/10 min and a VTMS content of 1.9 weight %. Produced in a tubular reactor at 2550 bar and 250° C.

Polymer B: High pressure produced ethylene-vinyl trimethoxysilane copolymer having a density of 925 kg/m³, $MFR_{2.16}$=0.9 g/10 min and a VTMS content of 1.25 weight %. Produced in a tubular reactor at 2400 bar and 280° C.

Polymer C: High pressure produced ethylene-vinyl-trimethoxysilane copolymer having a density of 922 kg/m³, $MFR_{2.16}$=0.9 g/10 min and a VTMS content of 1.25 weight %. Produced in a tubular reactor at 2300 bar and 310° C.

Polymer D: High pressure produced ethylene-vinyl-trimethoxysilane copolymer having a density of 922 kg/m³, $MFR_{2.16}$=0.9 g/10 min and a VTMS content of 1.9 weight %. Produced in a tubular reactor at 2300 bar and 310° C.

Polymer M-1: High density polyethylene (i. e. low pressure polyethylene) having a density of 954 kg/m³ and $MFR_{2.16}$=4 g/10 min.

Polymer M-2: High density grafted silane PEX polymer (i. e. silane grafted, cross-linked, low pressure polyethylene) having a density of 950 kg/m³ and $MFR_{5.0}$=1 g/10 min.

PVC-Jacket: typical PVC jacket formulation consisting of 20% plastisizer, e. g. dioctylphtalate, DOP, 20 weight % chalk and lead stabilizer.

Catalyst master batch CMB-1: In all examples 5% of CMB-1 was dry blended into the polymers prior to extrusion. CMB-1 consists of 1.7% dodecylbenzenesulphonic acid crosslinking catalyst, drying agent and antioxidants mixed into an ethylene butylacrylate copolymer. Butyl-acrylate content: 17 weight %, $MFR_2$=4.5 g/10 min.

Catalyst master batch CMB-2 consists of a standard tin silanol condensation catalyst dibutyl-tin-dilaurate (1%) and antioxidants mixed into a high density polyethylene. In all pipe examples 5% of CMB-2 was dry blended into the polymers prior to extrusion. The blend was extruded to 32×3 mm natural pipes which were kept in a water bath at 95° C. for at least 16 hours. Each pipe was pressure tested according to DIN 16894/16892.

The tested cables were manufactured in the following way: Cables consisting of an 8 mm² compact aluminium conductor and an insulation thickness of 0.7 mm were produced in a Nokia-Maillefer 60 mm extruder at a line speed of 75 m/min.

Die: Pressure (wire guide 3.1 mm, die 4.4 mm).

Conductor temperature: 20° C. (non-pre-heated conductor) or 110° C. (pre-heated conductor).

Cooling bath temperature: 23° C.

Screws: Elise.

Temperature profile: 170-180-190-190-190-190-190-190° C.

5% of the crosslinking catalyst master batch CMB-1 was dry blended into the polymers prior to extrusion.

In order to measure the influence of plastisizer migration the cable core produced according to the description above was coated with a 2 mm PVC jacket. The Mechanical evaluation of the cables were performed according to ISO 527.

TABLE 1

| Composition | VTMS weight % | MFR₂ g/10 min | Density kg/m³ | Temp ° C. | Stress MPa | Failure time h |
|---|---|---|---|---|---|---|
| Quality control point, DIN 16874 | | | | 95 | 2.8 | >1000 |
| Polymer D, LDPE VTMS copolymer | 1.9 | 0.9 | 922 | 95 | 2.8 | 0.7 |

TABLE 1-continued

| Composition | VTMS weight % | MFR$_2$ g/10 min | Density kg/m$^3$ | Temp ° C. | Stress MPa | Failure time h |
|---|---|---|---|---|---|---|
| Blend of polymer D with 30 weight % Polymer M-1 | 1.4 | 1.2 | 934 | 95 | 2.8 | 0.7 |
| Polymer A, MDPE VTMS co-polymer | 1.9 | 1.9 | 930 | 95 | 2.8 | >7700 no failure |

From table 1 it is clearly shown that by increasing the density of the copolymer resin (polymer D) by blending with a high density polyethylene polymer (30 weight % polymer M-1) will not result in passing the quality control point of pressure resistance at 95° C., see table 1. By increasing the density of the ethylene-vinyltrimethoxysilane copolymer base resin to 930 kg/m$^3$ (polymer A) the extruded and afterwards crosslinked pipes pass the quality control point of pressure resistance at 95° C. as stated in the German medium density norm for MD-PEX pipes, DIN 16894.

Example 2

By blending high density polyethylene into the ethylene-vinyltrimethoxysilane copolymer (polymer A) the hydrostatic pressure resistance will be increased. In table 2 below, the hydrostatic pressure behaviour of the medium density ethylene-vinyltrimethoxysilane copolymer (polymer A) and a blend of this silane copolymer with 15 weight % and 30 weight % high density polyethylene (polymer M-1) are shown. The gel content should preferably be >65% as measured according to ASTM D 2765.

TABLE 2

| Composition | Density kg/m$^3$ | Gel content % ASTM D 2765 | Stress MPa | Failure time hours |
|---|---|---|---|---|
| Polymer A, 930 kg/m$^3$ | 930 | 85 | 3.2 | 1.3 |
| | | | 3.0 | 89 and 17.2 |
| | | | 2.8 | >7700 no failure |
| +15 weight % HDPE | 934 | 75 | 3.6 | 3.3 |
| | | | 3.4 | 4.9 |
| | | | 3.2 | >6500 no failure |
| +30 weight % HDPE | 937 | 68 | 3.8 | 12 and 3.7 |
| | | | 3.6 | 545 and 628 |

Example 3

40 weight % of silane crosslinkable medium density polyethylene (MEPE) product polymer A having a density of 930 kg/m$^3$ was blended with 30 weight % of grafted silane crosslinked PEX high density polyethylene product polymer M-2 with a density of 950 kg/m$^3$ and 30 weight % of high density polyethylene product polymer M-1 having a density of 954 kg/m$^3$. The pressure resistance in accordance with the quality control point of pressure resistance at 95° C. as stated in the German high density norm for HD-PEX pipes., DIN 16892. The gel content should preferably be >65%, measured according to ASTM D 2765.

TABLE 3

| Composition | Density kg/m$^3$ | Gel content % ASTM D 2765 | Temp ° C. | Stress MPa | Failure time hours |
|---|---|---|---|---|---|
| Quality control point DIN 16892 | | >65 | 95 | 4.4 | >1000 |
| Polymer A | 930 | 85 | 95 | 4.4 | 0.1 |
| Polymer A/M-1/M-2 (40/30/30 weight %) | 943 | 68.5 | 95 | 4.4 | >1400 |
| | | | 95 | 4.6 | 290 |

Example 4

In order to investigate the need of preheating the conductor cables were produced with and without preheating of the conductors as described above. Some cable cores were coated with a 2 mm PVC jacket and aged in a heating oven at 100° C. for 168 hours. The results are presented in table 4.

TABLE 4

| Material | Specified demands (e.g. VDE 0273-603) | Polymer A +5% CMB-1 | Polymer B +5% CMB-1 | Polymer C +5% CMB-1 |
|---|---|---|---|---|
| Density (kg/m$^3$) ASTM D 2839 Insulation extruded on non-preheated conductor | | 930 | 925 | 922 |
| Tensile strength at break(MPa) ISO 527 | >12.5 | 15.0 | 13.1 | 12.5 |
| Elongation at break (%) ISO 527 Insulation extruded on preheated conductor | >200 | 245 | 204 | 180 |
| Tensile strength at break (MPa) ISO 527 | >12.5 | 24.7 | 21.9 | 19.7 |

TABLE 4-continued

| Material | Specified demands (e.g. VDE 0273-603) | Polymer A +5% CMB-1 | Polymer B +5% CMB-1 | Polymer C +5% CMB-1 |
|---|---|---|---|---|
| Elongation at break (%) ISO 527 | >200 | 440 | 368 | 361 |
| Ageing of cable in contact with PVC jacket, 168 h, 100° C. | | | | |
| Change of tensile strength at break (%) | <25 | 18 | 23 | >30 |
| Change of elongation at break (%) | <25 | 15 | 22 | >30 |
| Weight increase (%) | No requirement | 12 | 15 | 19 |

The results presented in table 5 show that polymers A and B fulfil the specified requirements (e. g. VDE 0273-603) without any need of preheating or use of protection layers between the PVC jacket and the insulation.

The invention claimed is:

1. A pipe made of a crosslinkable polyethylene composition containing a crosslinkable high-pressure ethylene silane copolymer resin having a content of silane of about 0.1 to 10 wt %, less than 40 wt % high density polyethylene, and at least one silanol condensation catalyst, wherein the ethylene silane copolymer resin has a density of >925 kg/m$^3$ and wherein the composition provides a pipe that has pressure resistance at 95 °C. of at least 4.4 MPa for a failure time of at least 1000 hours.

2. The pipe according to claim 1, wherein the ethylene silane copolymer resin has a density of >928 kg/m$^3$.

3. The pipe according to claim 2, wherein the ethylene silane copolymer resin is an ethylene-vinyltriethoxysilane copolymer, an ethylene-gamma-methacryloxytriethoxysilane copolymer, an ethylene-vinyltrimethoxysilane copolymer or an ethylene-gamma-trimethoxysilane copolymer resin.

4. The pipe according to claim 1, wherein the amount of high density polyethylene is 15-35 wt.-%.

5. The pipe according to claim 1, wherein the MFR$_2$ at 190° C./2.16 kg of the composition is 0.1-100 g/10 mm.

6. The pipe according to claim 1, wherein the elongation at break is >200% as measured according to ISO 527.

7. The pipe according to claim 1, wherein the tensile strength at break is >12.5 Mpa as measured according to ISO 527.

8. The pipe according to claim 1, wherein gel content is >65 weight % as measured according to ASTM D 2765.

9. The pipe according to claim 1, wherein the polyethylene composition further comprises 0.1 to 2.0 wt.-% of a drying agent.

10. The pipe according to claim 1, wherein the amount of high density polyethylene is 20-30 wt-%.

11. A pipe made of a crosslinkable polyethylene composition comprising an ethylene-vinyltrimethoxysilane copolymer resin having a content of silane of about 0.1 to 10 wt %, less than 40 wt % high density polyethylene, and at least one silanol condensation catalyst, wherein the ethylene silane copolymer resin has a density of >925 kg/m$^3$ and wherein the composition provides a pipe that has pressure resistance at 95 °C. of at least 4.4 MPa for a failure time of at least 1000 hours.

12. A pipe made of a crosslinkable polyethylene composition, the composition comprising:
   a crosslinkable high-pressure ethylene silane copolymer resin having a content of silane of about 0.1 to 10 wt %;
   at least one silanol condensation catalyst; and
   20-30 wt % high density polyethylene;
   wherein:
      the ethylene silane copolymer resin has a density of >925 kg/m$^3$; and
      the pipe has pressure resistance at 95° C. of at least 4.4 MPa for a failure time of at least 1000 hours.

13. A pipe made of a crosslinkable polyethylene composition, the composition comprising:
   a crosslinkable high-pressure ethylene silane copolymer resin having a content of silane of about 0.1 to 10 wt %;
   at least one silanol condensation catalyst; and
   <40 wt % high density polyethylene;
   wherein:
      the ethylene silane copolymer resin has a density of >928 kg/m$^3$; and
      the pipe has pressure resistance at 95° C. of at least 4.4 MPa for a failure time of at least 1000 hours.

* * * * *